(12) United States Patent
Chomyn et al.

(10) Patent No.: US 7,969,660 B2
(45) Date of Patent: Jun. 28, 2011

(54) MATERIALS AND METHODS FOR PRODUCING LENSES

(75) Inventors: Jeffrey S. Chomyn, West Chester, PA (US); Lawrence H. Sverdrup, Poway, CA (US); Jagdish M. Jethmalani, San Diego, CA (US); Andreas W. Dreher, Escondido, CA (US)

(73) Assignee: Opthonix, Inc., Vista, CA (US)

( * ) Notice: Subject to any disclaimer, the term of this patent is extended or adjusted under 35 U.S.C. 154(b) by 0 days.

(21) Appl. No.: 12/762,259

(22) Filed: Apr. 16, 2010

(65) Prior Publication Data

US 2010/0265457 A1    Oct. 21, 2010

Related U.S. Application Data

(63) Continuation of application No. 11/653,498, filed on Jan. 16, 2007, now Pat. No. 7,701,641.

(60) Provisional application No. 60/784,394, filed on Mar. 20, 2006.

(51) Int. Cl.
  *G02B 9/00*  (2006.01)
  *B29B 11/00*  (2006.01)

(52) U.S. Cl. ......... 359/652; 359/642; 351/177; 264/1.1; 264/1.7

(58) Field of Classification Search .......... 351/159, 351/177; 359/642, 652; 264/1.1, 1.7, 1.8
See application file for complete search history.

(56) References Cited

U.S. PATENT DOCUMENTS

| | | | |
|---|---|---|---|
| 2003/0003295 A1 * | 1/2003 | Dreher et al. | 428/332 |
| 2003/0128336 A1 | 7/2003 | Jethmalani et al. | |
| 2005/0046957 A1 | 3/2005 | Lai et al. | |
| 2005/0105048 A1 | 5/2005 | Warden et al. | |
| 2006/0050228 A1 * | 3/2006 | Lai et al. | 351/159 |
| 2006/0052547 A1 * | 3/2006 | Jethmalani et al. | 525/333.3 |

FOREIGN PATENT DOCUMENTS

| | | |
|---|---|---|
| WO | WO-2004/034095 | 4/2004 |
| WO | WO-2005/050289 | 6/2005 |
| WO | WO-2006/029264 | 3/2006 |

OTHER PUBLICATIONS

International Preliminary Report on Patentability for PCT/US2007/007000, mailed Oct. 2, 2008, 5 pages.

* cited by examiner

*Primary Examiner* — Joseph Martinez
*Assistant Examiner* — James R Greece
(74) *Attorney, Agent, or Firm* — Morrison & Foerster LLP

(57) ABSTRACT

The subject invention provides methods for creating wavefront aberrators with a desired refractive index profile that is stable against thermal and/or solar exposure. The invention further provides wavefront aberrators produced according to the methods described herein.

20 Claims, 15 Drawing Sheets

OPD after 140 sec Radiation (Peak-to-Valley= 0.427 microns)

OPD after 2 hrs Diffusion (Peak-to-Valley= 0.874 microns)

OPD after 4 hrs Diffusion
(Peak-to-Valley= 1.486 microns)

OPD after 6 hrs Diffusion
(Peak-to-Valley= 2.151 microns)

Range (PV) = 1.1565 waves, RMS = 0.2291 waves, Strehl = 0.1259

Range (PV) = 3.0899 waves, RMS = 0.6236 waves, Strehl = 0.0000

MATERIALS AND METHODS FOR PRODUCING LENSES

CROSS REFERENCE TO RELATED APPLICATION

This application is a continuation of U.S. patent application Ser. No. 11/653,498, filed Jan. 16, 2007, now U.S. Pat. No. 7,701,641 entitled "Materials and Methods for Producing Lenses," which claims the benefit of priority under 35 U.S.C §119(e) from U.S. Provisional Patent Application No. 60/784,394, filed Mar. 20, 2006. The contents of these applications are herein incorporated by reference in their entirety.

BACKGROUND OF THE INVENTION

A lens is a device usually formed from a piece of shaped glass or plastic that causes light to either converge and concentrate, or to diverge. One important use of lenses is as a prosthetic for the correction of visual impairments such as myopia, hyperopia and presbyopia. Other uses are in imaging systems such as a monocular, binoculars, telescopes, spotting scopes, telescopic gun sights, theodolites, microscopes, and cameras (photographic lens).

Lenses do not form perfect images; there is always some degree of distortion or aberration introduced by the lens that causes the image to be an imperfect replica of the object. Thus, aberrations result when the optical system misdirects some of the object's rays. There are several types of aberration that can affect image quality. Some aberrations occur when electromagnetic radiation of one wavelength is being imaged (monochromatic aberrations), and others occur when electromagnetic radiation of two or more wavelengths is imaged (chromatic aberrations).

Because distortion introduced by aberrations into an optical system significantly degrades the quality of the images on the image plane of such system, there are advantages to the reduction of those aberrations. Various techniques are often used to minimize the aberrations. One such technique involves the use of a wavefront aberrator.

Wavefront aberrators are particularly useful in eye glasses or contact lenses for use in correcting human eye sight. U.S. Pat. No. 6,989,938 (the '938 patent) describes a wavefront aberrator and methods for manufacturing it. The '938 patent describes how a unique refractive index profile can be created across a monomer layer by controlling the extent of curing of the monomer in different regions of the layer, thus creating a wavefront aberrator.

The '938 patent describes a method that allows one to achieve a unique refractive index profile through the creation of regions with varying degrees of cure. While this technology is very useful, it gives rise to problems with lens stability. Because of the varying degrees of cure, a concentration gradient of monomer between different regions exists which may cause the monomer to diffuse over time. As the monomer diffuses from one region to another, the refractive index profile changes. As a result, the refractive index profile at a later time can be substantially different than the desired original refractive index profile that was initially created.

Also, curing of the lesser cured regions after the desired refractive index profile is created can lead to changes in the profile due to reduction of the contrast in the refractive index between the lesser cured and more highly cured regions. Unwanted curing of the lesser cured regions over time can take place by, for example flood photopolymerization (or flood curing) which activates polymerization initiators. Flood curing is process whereby substantially uniform radiation (light) is applied to an uncured or partially cured material over time. The time period can be long or short. This causes cross-linking of previously uncured monomers, and refractive index increases in the previously lesser cured regions, bringing their refractive indices closer to those of the originally more cured regions. A reduction in refractive index contrast results in changes to the optical characteristics. Exposure to sunlight is an example of a scenario under which refractive contrast is diminished by flood photopolymerization.

Some of these issues could be addressed by optimizing storage conditions to prevent changes in the optical characteristics. A wavefront aberrator could be stored at freezing conditions to prevent (or at least significantly slow) diffusion of monomer between lesser cured and more highly cured regions. Low temperature would also retard the rate of thermal polymerization. Furthermore, a wavefront aberrator could be stored in dark conditions to prevent activation of the polymerization initiator. Unfortunately a need for specific storage conditions could limit the number of practical applications for the wavefront aberrator. For example, one specific application of a wavefront aberrator is in a form similar to glasses or contact lenses to correct the aberrations of the human eye. Because humans wear their glasses in a variety of conditions (hot/cold, humid/dry, sunny/dark), temperature and light exposure can not be easily controlled. Thus, additional methods for creating stable refractive index profiles are needed.

The subject invention successfully addresses the above-described disadvantages associated with the prior art and provides certain attributes and advantages that have not been realized by the prior art.

BRIEF SUMMARY

The subject invention provides methods for creating wavefront aberrators with a desired refractive index profile that is stable against thermal and/or solar exposure. The invention further provides wavefront aberrators produced according to the methods described herein.

By creating a wavefront aberrator with a refractive index profile that is stable against thermal and solar exposure, the number of practical applications for the wavefront aberrator are significantly increased. Specifically exemplified herein is the use of these wavefront aberrators in eyeglasses or contact lens.

In an embodiment exemplified herein, the wavefront aberrator of the present invention comprises a pair of transparent lenses separated by a formulation layer comprising a polymer and which exhibits a variable index of refraction as a function of the extent of monomer curing.

In one embodiment, the wavefront aberrator of the subject invention can be produced by a process that comprises selective irradiation of the formulation layer using a "photomask". The curing pattern dictated by the transmittance profile of the photomask creates a desired refractive index profile in the wavefront aberrator. In an alternative embodiment, the method of creating the wavefront aberrator of the present invention comprises the creation of a curing pattern by use of a digital light projector (DLP).

After an intermediate refractive index profile is created by exposure to a curing pattern, the wavefront aberrator of the present invention is processed in a manner that results in a final desired refractive index profile that is stable to thermal and/or solar conditions.

In a preferred embodiment, after an intermediate refractive index profile is created in the wavefront aberrator, the wave front aberrator is exposed to elevated temperatures to induce accelerated diffusion of uncured monomer, which is described herein as the "diffusion process". After the wavefront aberrator has undergone the diffusion step, it is then exposed to flood irradiation in order to cure substantially all of the previously uncured monomer. After the flood irradiation step is performed, the final variable refractive index profile for the wavefront aberrator is obtained. Advantageously, at this point, virtually all of the previously uncured monomer is cured, and the formulation layer is virtually entirely cross-linked. Because all of the monomers are cross-linked, the resulting refractive index profile in the wavefront aberrator is stable to thermal and/or solar conditions. Thereafter, the refractive index profile will not change as a result of diffusion of the monomer or light exposure because the monomers are completely cured and immobilized as part of a crosslinked network.

The subject invention further provides a method for predicting and accounting for the changes in refractive index profile that take place due to diffusion.

Another advantage of using the method provided by the subject invention is that a larger optical path difference (OPD) of a material is achievable. OPD is calculated by multiplying the index of refraction (n) of the material by the material's thickness. The OPD values obtained for wavefront aberrators produced using the method of the subject invention (creating the refractive index profile, allowing for diffusion, then flood irradiating) can be several times higher than the maximum achievable OPD for wavefront aberrators produced using the methods of the prior art (creating the refractive index profile only).

Being able to produce wavefront aberrators with larger OPD values is very advantageous for human vision correction. Wavefront aberrators of the subject invention with large OPD values facilitate correcting patients with significantly higher wavefront errors than wavefront aberrators of the prior art.

DETAILED DISCLOSURE

Figure 1:
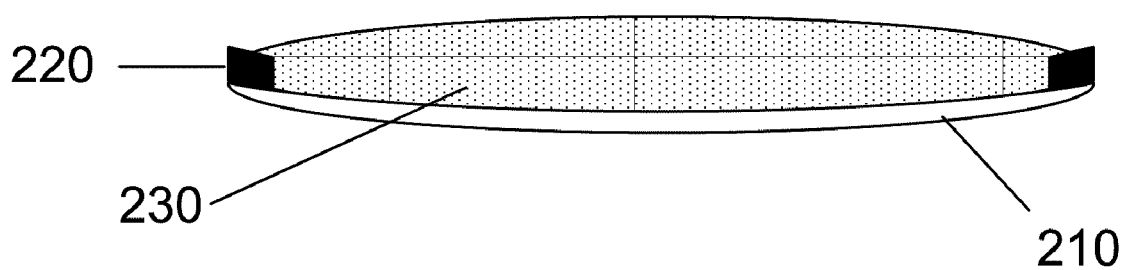
FIG. 1 is a cross-sectional view illustrating a lens assembly.

The subject invention provides methods for creating wavefront aberrators that have a desired refractive index profile that is stable against thermal and/or solar exposure. By creating a wavefront aberrator with a final refractive index profile that is stable against thermal and solar exposure, the number of practical applications for the wavefront aberrator are increased. One advantage of aberrators produced according to the subject invention is that these aberrators can be used to make lenses that correct human vision, and which can be worn in a variety of solar and thermal conditions.

U.S. Pat. No. 6,989,938 (hereinafter the '938 patent, which is incorporated herein by reference in its entirety) describes various applications of wavefront aberrators that can be programmed to have a particular and unique refractive index profile.

In a preferred embodiment, the wavefront aberrator of the present invention comprises a pair of transparent lenses separated by a formulation layer that includes a polymer material. In one embodiment, the formulation layer may contain a thio-cured epoxy. The formulation layer exhibits a variable index of refraction as a function of the extent of monomer curing.

Preparation of Intermediate Refractive Index Profile

Several techniques for selectively illuminating the formulation layer to create regions with differing extents of curing (and thus varying refractive index) across the epoxy material are described in the '938 patent. The techniques utilize, for example, LEDs, LCDs, and point light sources.

In one embodiment, the wavefront aberrator of the subject invention can be produced by a process that comprises selective irradiation of the formulation layer using a "photomask". The "photomask" is printed on a transparency using, for example, an ink jet printer. The greyscale of the ink is varied in different regions of the mask to allow for various levels of light transmittance through the different regions of the mask. A uniform light source is relayed through the photomask to the formulation layer, and the extent of cure in a given region of the formulation layer is a function of the transmittance through the corresponding region of the photomask and exposure time. The curing pattern dictated by the transmittance profile of the photomask creates a desired refractive index profile in the wavefront aberrator.

In an alternative embodiment, the method of creating the wavefront aberrator of the present invention comprises the creation of a curing pattern by use of a DLP.

After a first refractive index profile is created using, for example, one of the aforementioned techniques, the wavefront aberrator of the subject invention is stabilized in a manner such that it has a final desired refractive index profile that is stable to thermal and/or solar conditions.

Diffusion

The first step in the refractive index profile stabilization process is to allow for diffusion of uncured monomer between the lesser cured and more highly cured regions of the wavefront aberrator after it has been partially cured to form the intermediate refractive index profile. This is the diffusion process. In a preferred embodiment, the wavefront aberrator is placed at an elevated temperature to induce accelerated diffusion of uncured monomer. The refractive index profile changes from the original profile during the diffusion step.

The amount of diffusion that will occur may be predicted based on the heating temperature, heating time period, previous photo-patterning, the types of materials being treated, and the types and thicknesses of any substrates.

Due to the nature of the diffusion process, the temperature required to force diffusion of uncured monomer depends on the stiffness of the substrates between which the photocurable gel (having, for example, monomers and polymerization initiators/inhibitors dispersed therein) is sandwiched. During the diffusion process, material flows down a concentration gradient from lesser cured regions (higher monomer concentration) to more highly cured regions (lower monomer concentration, due to previous crosslinking of monomers by photocuring).

As monomer flows into the crosslinked networks of the more highly cured regions, it penetrates those networks and swells them. In order for the monomer to be able to swell the crosslinked networks (located in the formulation layer), the substrates that bound those networks should be flexible enough to bend to allow for the swelling. As the substrates bend to allow for swelling, the shape of the surface of each substrate changes where the bending/swelling take place. Furthermore, the overall thickness of the wavefront aberrator increases where the bending/swelling takes place.

The changes in substrate surface shape and wavefront aberrator thickness due to the surface bending and polymer swelling result in changes to the optical characteristics of the wavefront aberrator during the monomer diffusion process. More specifically, increases in substrate surface curvature and wavefront aberrator thickness from bending/swelling during diffusion result in an increase in the optical path length of light through the more highly cured regions of the original refractive index profile. This in turn increases the magnitude of the optical characteristics corresponding to the original refractive index profile.

Substrates that are made from stiffer materials and/or thicker materials are more resistant to bending and thus more resistant to swelling of the formulation layer. A higher resistance to swelling by the substrate in turn results in a higher resistance to monomer diffusion because diffusion of the monomer is reduced if the monomer cannot move into the crosslinked networks. When using substrates made of stiffer and/or thicker materials, a higher temperature may be used to enhance substrate flexibility, and thus enhance monomer diffusion rates.

Other factors in addition to substrate thickness/rigidity may affect the rate of diffusion. One of these factors is the viscosity of the diffusing monomer. The lower the viscosity of the diffusing monomer, the easier it is for the monomer to move from uncured regions to more highly cured regions, and penetrate the crosslinked networks of those regions. This leads to higher diffusion rates with lower viscosity monomers.

Another factor influencing diffusion rate is the density of the polymer network through which the monomer diffuses. For example, if the gel comprises a thiol-cured epoxy matrix with monomer dispersed therein, the amount of monomer relative to the amount of thiol-cured epoxy influences the diffusion rate. The higher the percentage of thiol-cured epoxy (matrix) in the gel, the more dense the gel matrix, and the more difficult it is for monomer to diffuse through the network. This leads to lower diffusion rates for gels with a higher matrix percentage.

One advantageous aspect of the diffusion process of the subject invention is that it does not require continuous exposure at elevated temperature to reach the desired end point. If the substrates are sufficiently rigid/thick to resist diffusion/swelling at room temperature, the diffusion process can be paused by discontinuing exposure of the wavefront aberrator to elevated temperature, and returning it to room temperature. The wavefront aberrator can be stored at room temperature for a given time without significant changes to the optical characteristics, and the diffusion process can be continued at a later time by simply elevating the temperature again. This can be advantageous from a manufacturing standpoint as it helps eliminate possible constraints posed by a normal work day/week. For example if the diffusion process were only halfway complete at the end of the work day on Friday, the lens could be stored at room temperature over the weekend, and the diffusion process could be continued on Monday by returning the wavefront aberrator to elevated temperature.

The subject invention further provides methods for predicting and accounting for the changes in refractive index profile that take place due to diffusion in order to create the desired wavefront aberrator.

Flood Irradiation

After the wavefront aberrator has undergone the diffusion step, it can be exposed to flood irradiation in order to cure the previously uncured monomer. If the combination of diffusion time and temperature utilized during the diffusion step is enough to allow for sufficient diffusion of monomer to form a wavefront aberrator having the desired OPD, the refractive index profile will not change significantly during the flood irradiation step.

After the flood irradiation step is performed, virtually all of the previously uncured monomer is cured and the formulation layer is essentially entirely crosslinked. Thus, the final refractive index profile for the wavefront aberrator is obtained. Because all of the monomers are cross-linked, the resulting refractive index profile in the wavefront aberrator is stable to thermal and solar conditions. Thereafter, the refractive index profile will not change from further diffusion of monomer because the monomers are completely cured and immobilized as they are part of a cross-linked network. The complete curing of monomers during the flood irradiation step also prevents the monomers from further photo-curing (from solar/UV exposure for example) after the final refractive index profile is obtained.

The optical characteristics of the final wavefront aberrators are stable against accelerated weathering/thermal/solar exposure tests, commercial AR and hardcoating operations, and other operations that involve dipping of optical elements into non-corrosive aqueous solutions (tinting, UV-dying, etc.).

Increase in OPD

A further advantage of using the method provided by the subject invention is that a larger optical path difference (OPD) is achievable. The OPD values obtained for wavefront aberrators produced using the method of the subject invention (creating the refractive index profile, allowing for diffusion, then flood irradiating) can be significantly higher than the maximum achievable OPD for wavefront aberrators produced using the method of prior art (creating the refractive index profile only). Being able to produce wavefront aberrators with OPD values that are larger is very advantageous for the field of human vision correction. Wavefront aberrators of the subject invention with large OPD values facilitate correcting patients with significantly higher wavefront errors than wavefront aberrators of the prior art.

The maximum achievable OPD values for wavefront aberrators made by other methods may be lower where OPD increases can only be accomplished by a change, such as an increase, in refractive index. Furthermore, as monomers are photocured and the refractive index of the gel increases, the gel shrinks due to the nature of densification through crosslinking. If the substrates are sufficiently flexible/thin, this may cause the substrates bounding the gel to bend inwards as the gel shrinks, resulting in a decrease in thickness, and thus a decrease in optical path. Although the OPD gained by refractive index increase exceeds that lost by the slight decrease in thickness due to shrinkage, the maximum OPD may still be limited by the reduced thickness.

In the method described herein, some OPD can be obtained by photocuring to create an initial refractive index profile. Then the diffusion step can lead to outward bending of the substrates through swelling of the gel in certain regions as monomer diffuses into those regions. The OPD can be thus increased by means of the increasing wavefront aberrator thickness and the increasing substrate surface curvature resulting from the swelling. Thus, because this method utilizes an increase in refractive index, substrate surface curvature, and thickness as modes for increasing OPD (as compared to methods that utilize only refractive index increase), much higher OPD values are obtainable with the method of the subject invention.

Figure 14A:
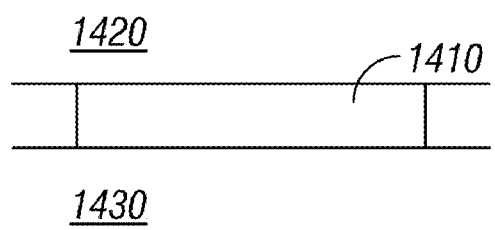
FIG. 14A-D shows OPD growth during the diffusion process.
Figure 14B:
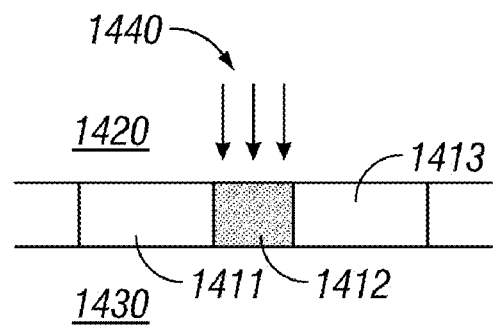
Figure 14C:
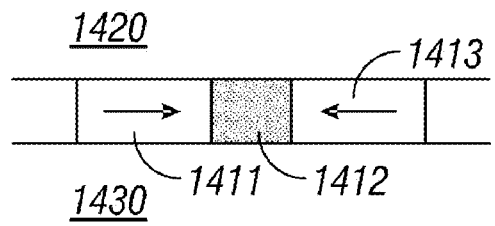
Figure 14D:
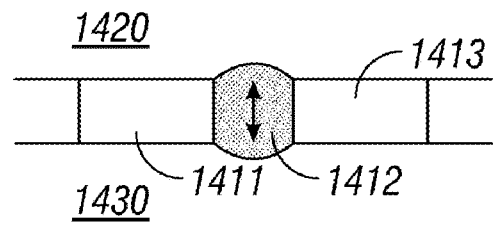

FIG. 14A-D shows OPD growth during the diffusion process, in accordance with an exemplary embodiment of the present invention. FIG. 14A illustrates a gel 1410 sandwiched between two substrates 1420 and 1430, wherein the gel includes an uncured monomer. FIG. 14B illustrates a photocuring stimulus 1440 crosslinking a region 1412 of the gel that is exposed to the photocuring stimulus. As a result of the photocuring, the exposed region 1412 undergoes an increase in refractive index and a decrease in monomer concentration. FIG. 14C illustrates diffusion of monomers from the uncured regions 1411 and 1413 (high monomer concentration) to the exposed region 1412 (low monomer concentration). FIG. 14D illustrates swelling of exposed region 1412 resulting from the diffusion of monomer. The substrates 1420 and 1430 bend outward to accommodate swelling of the gel. The thickness increases and the surface curvature increases.

A more complete understanding of the invention can be obtained by reference to the following examples of compounds, compositions, and methods of the invention. The following examples illustrate procedures for practicing the invention. These examples should not be construed as limiting. It will be apparent to those skilled in the art that the examples involve use of materials and reagents that are commercially available from known sources, e.g., chemical supply houses, so no details are given respecting them.

Example 1

Wavefront Aberrator Sample Preparation

Part I: In a 500 mL flask, 100 g of poly[(phenylglycidyl ether)-co-formaldehyde], 49.42 g of diallylether Bisphenol A, 0.2761 g of Irgacure 184, and 0.0552 g of N-PAL were dissolved in acetone. The mixture was then filtered through a 0.2 μm syringe filter into another clean 500 mL flask. The filtrate was rotary evaporated at 60° C. for 2 hours to evaporate all acetone.

Part II: In another 500 mL flask, 3.27 g of tetrabutyl ammonium bromide, and 150 g of trimethylolpropane tris(3-mercaptopropionate) were dissolved in acetone. The mixture was then filtered through a 0.2 μm syringe filter into another clean 500 mL flask. The filtrate was rotary evaporated at 50° C. for 2 hours to evaporate all acetone.

A portion of Parts I and II were mixed in a ratio of 1.157:1, respectively. The Part I composition was weighed carefully in a 20 mL scintillation vial. Based on the amount of Part I formulation, the calculated amount of Part II was added to the same vial. The two compositions were mixed thoroughly by hand using a glass stirring rod.

Figure 2:
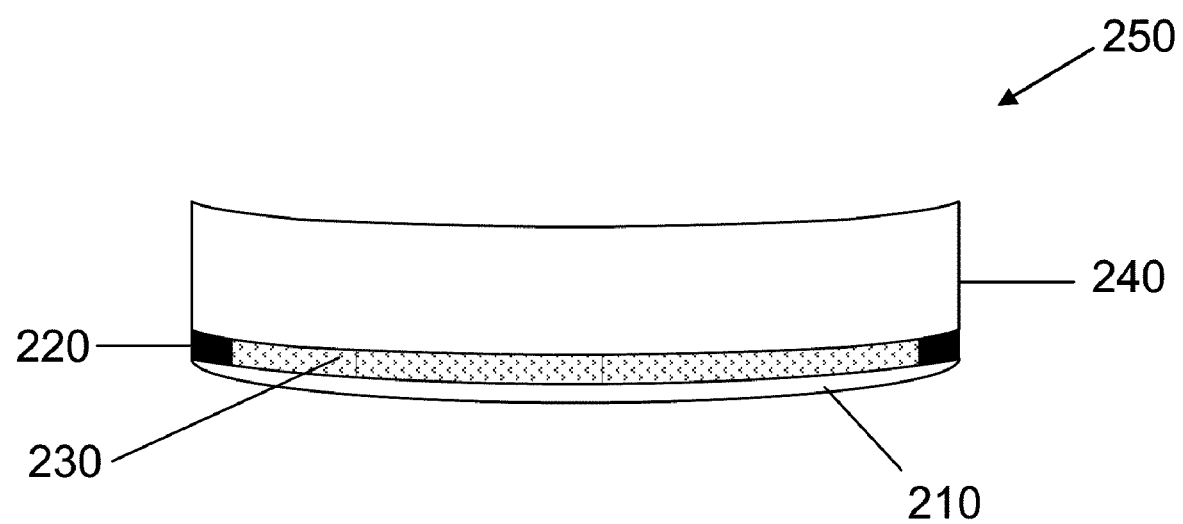
FIG. 2 is a cross-sectional view illustrating a lens assembly.

Approximately 2.6 grams of the mixture was transferred to the concave surface of a Samsung EyeTech UV-Clear 1.6 cover 210 (schematically illustrated in FIG. 1, which is a cross sectional view) equipped with spacers 220 (pieces of adhesive tape with 20 mil thickness placed around the edges on the concave side of the cover lens). The mixture 230 on the cover 210 was degassed to remove trapped air. A Samsung UV-Clear 1.6 base lens 240 with a 5.0 base curve was carefully placed over the cover lens and the lenses were pressed firmly together, with the degassed mixture 230 sandwiched between to make a lens assembly 250 (schematically illustrated in FIG. 2 as a cross sectional view). The lens assembly 250 was maintained at 75° C. for 5½ hours to cure the sandwiched mixture 230 to a gel. The gel 230 comprised a thiol-cured epoxy having diallylether Bisphenol A and trimethylolpropane tris(3-mercaptopropionate) dispersed therein. After the lens assembly 250 was cooled to room temperature, the base lens 240 was then ground to "plano" to form an optical element with no net optical power.

Example 2

Correction of Aberrations of Optical Systems

A plano power optical element was prepared as described in Example 1. The optical element was placed in a hot box with a lens holder at 85 C. An EKED Omnicure UV lamp with a square cross-section mixing rod was used to produce a uniform beam of ultraviolet radiation (Intensity≈9.5 mW/cm$^2$) which irradiated a DLP micro-mirror array.

Figure 3:
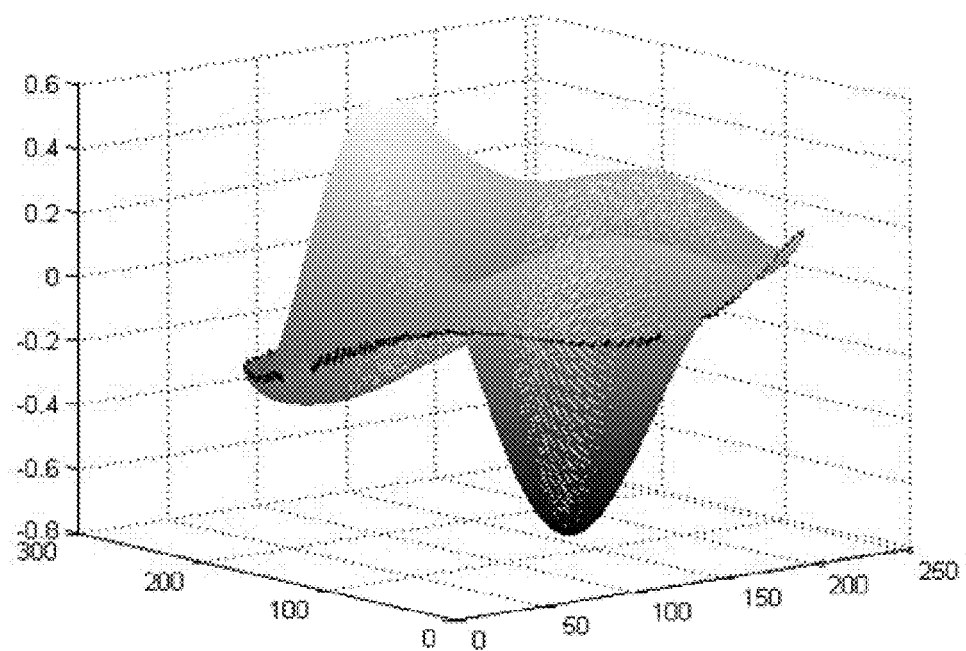
FIG. 3 is an OPD map of a model eye.

The central region of the sandwiched gel in the lens assembly was exposed to an ultraviolet radiation pattern re-imaged from the DLP corresponding to the aberrations of a model eye (see FIG. 3) for 100 seconds. A wavefront lensometer was used to measure the OPD pattern created in the sandwiched gel 230 as a result of the ultraviolet exposure. The peak-to-valley of the OPD pattern was measured to be 0.446 microns. The hot box temperature was adjusted to 105 C and the lens was kept in the hot box for an additional 4 hours to force diffusion of uncured monomer into the regions where monomer had been depleted by ultraviolet radiation.

A wavefront lensometer was again used to measure the OPD pattern, and it was determined that the peak-to-valley of the OPD pattern had increased from 0.446 microns to 1.565 microns (a 350% increase). The lens was then taken out of the hot box set at 105 C and placed in another hot box set at 85 C. A Dymax UV lamp with a square cross-section mixing rod was used to produce a uniform beam of ultraviolet radiation (Intensity≈30 mW/cm$^2$), and flood cure the optical element to lock in the OPD pattern. A wavefront lensometer was used to measure the OPD pattern of the lens after flood curing, and it was found that the peak-to-valley of the OPD pattern had changed from 1.565 microns to 1.460 microns (a 6.7% decrease).

A more detailed description of the OPD pattern for each lensometer measurement is given in terms of Zernike coefficients in Table 1. After the flood curing was complete, the lens was cut in half where the model eye pattern was located. One half of the lens was placed on a micrometer stand, and observed under a microscope. Using the micrometer, it was determined that the thickness of the top substrate layer (Samsung EyeTech 1.6 lens) was 0.38 mm, the thickness of the sandwiched gel layer was 0.57 microns, and the thickness of the bottom substrate layer (Samsung EyeTech 1.6 lens) was 0.63 mm.

TABLE 1

| | Eye H.O. Zernikes | After UV radiation pattern with DLP | After 4 hours at 105 C. | After Flood Cure |
|---|---|---|---|---|
| Z(2,−2) | 0.000 | 0.004 | −0.010 | −0.039 |
| Z(2,0) | 0.022 | 0.009 | 0.061 | 0.097 |
| Z(2,2) | 0.000 | −0.004 | −0.005 | 0.025 |
| Z(3,−3) | 0.023 | 0.006 | 0.028 | 0.040 |
| Z(3,−1) | −0.144 | −0.040 | −0.158 | −0.138 |
| Z(3,1) | 0.083 | 0.021 | 0.090 | 0.092 |
| Z(3,3) | 0.026 | 0.009 | 0.037 | 0.031 |
| Z(4,−4) | 0.001 | 0.001 | 0.003 | 0.002 |
| Z(4,−2) | 0.002 | 0.002 | 0.009 | 0.007 |
| Z(4,0) | −0.141 | −0.041 | −0.148 | −0.125 |
| Z(4,2) | 0.001 | −0.001 | 0.000 | −0.003 |
| Z(4,4) | −0.007 | 0.000 | 0.002 | 0.006 |
| Z(5,−5) | 0.000 | 0.000 | −0.001 | −0.002 |
| Z(5,−3) | −0.032 | −0.011 | −0.032 | −0.028 |
| Z(5,−1) | 0.082 | 0.032 | 0.091 | 0.091 |
| Z(5,1) | −0.049 | −0.018 | −0.052 | −0.051 |
| Z(5,3) | −0.036 | −0.015 | −0.041 | −0.037 |
| Z(5,5) | 0.000 | 0.001 | 0.000 | 0.001 |
| Z(6,−6) | 0.000 | 0.000 | −0.001 | −0.002 |
| Z(6,−4) | −0.001 | −0.001 | −0.002 | −0.001 |
| Z(6,−2) | 0.000 | −0.004 | −0.007 | −0.005 |
| Z(6,0) | 0.083 | 0.031 | 0.086 | 0.075 |
| Z(6,2) | −0.001 | −0.001 | −0.001 | −0.003 |
| Z(6,4) | −0.006 | 0.000 | 0.001 | −0.003 |
| Z(6,6) | 0.000 | 0.000 | 0.001 | −0.002 |
| PV (microns) | 1.335 | 0.446 | 1.565 | 1.460 |

Example 3

Diffusion Rate and OPD Growth Rate Control

Two plano power optical elements were prepared as described in Example 1. Each optical element was placed in a hot box with a lens holder at 85 C. The DLP system of Example 2 was used to expose the formulation layer of each optical element to an ultraviolet radiation pattern corresponding to the aberrations of a model eye. The first optical element was exposed to the pattern for 60 seconds, and the second optical element was exposed for 120 seconds.

A wavefront lensometer was used to measure the resulting OPD pattern in each optical element. The peak-to-valley the OPD pattern in the first optical element was 0.235 microns, and the peak-to-valley for the second optical element was 0.473 microns.

The temperature of the lens hot box was adjusted to 105 C. The first optical element was kept in the lens hot box at 105 C for 4 hours and 8 minutes, and the second optical element was kept at 105 C for 3 hours and 32 minutes to force diffusion of uncured monomer into the regions where monomer had been depleted by ultraviolet radiation.

A wavefront lensometer was used to measure the OPD pattern in each optical element at various times as they were kept at 105 C, and the peak-to-valley growth rate for each optical element was observed to be linear. The final peak-to-valley for the OPD pattern of the first optical element was 0.873 microns, and the peak-to-valley for the second optical element was 1.530 microns. A peak-to-valley growth rate of 0.154 microns/hour was calculated for the first optical element, and a peak-to-valley growth rate of 0.299 microns/hour was calculated for the second optical element. The peak-to-valley growth rate for the second optical element was approximately double that for the first optical element.

The ultraviolet exposure time used for the second optical element was double that for the first optical element. A doubling in ultraviolet exposure time lead to a doubling in cure percentage in the regions exposed to the UV pattern. This caused the monomer concentration gradient between exposed regions where monomer was depleted by UV curing and unexposed regions to double. This in turn lead to a doubling in the rate of monomer diffusion from unexposed regions to exposed regions where monomer was depleted by UV curing, leading to a doubling of the peak-to-valley growth rate for the second optical element.

Example 4

OPD Possible by Prior Art

Four plano optical elements were prepared as described in Example 1 and labeled 2830, 2831, 2833 and 2866. Each optical element had a center thickness of approximately 1.5 mm. A DLP system similar to that described in Example 2 was used to irradiate four wavefront aberrators with a trefoil pattern in a lens hot box at 85 C. The intensity of the UV light at the formulation layer of the wavefront aberrator was about 31 mW/cm$^2$.

Figure 4:
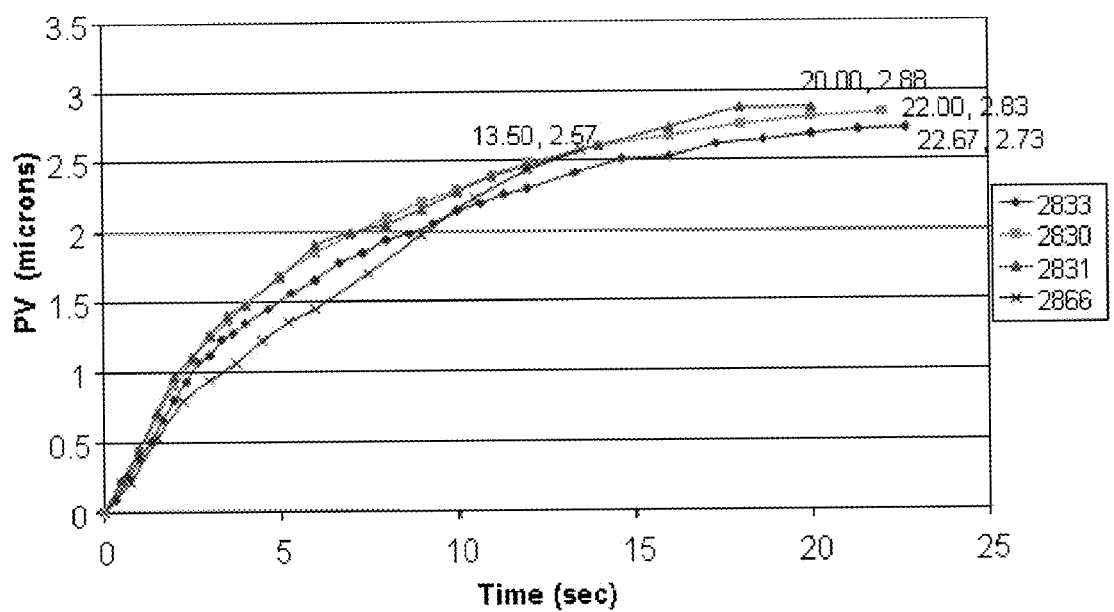
FIG. 4 shows the curing curves (OPD vs time) for each wavefront aberrator with the maximum OPD values and the times required to obtain those values labeled at the end of each curve.

The OPD generated in the wavefront abberator was measured at various times throughout the irradiation process by a lensometer until a maximum OPD was achieved. FIG. 4 shows the curing curves (OPD vs time) for each wavefront aberrator with the maximum OPD values and the times required to obtain those values labeled at the end of each curve. The average maximum OPD value obtained for the four wavefront aberrators was 2.75 microns.

Example 5

Increased OPD with Method of Subject Invention

Three plano power optical elements were prepared as described in Example 1. Each optical element was placed in a hot box with a lens holder at 85 C. The DLP system described in Example 2 was used to expose each optical element to an ultraviolet radiation pattern corresponding to the (3,−3) trefoil aberration for 140 seconds.

A wavefront lensometer was used to measure the resulting OPD pattern in each optical element. The peak-to-valleys of the OPD patterns for the optical elements were found to be 0.793 microns, 0.587 microns, and 0.581 microns with (3,−3) Zernike coefficients of 0.130 microns, 0.090 microns, and 0.088 microns respectively. The optical elements were then kept in an oven at 105 C for an additional 16 hours to force diffusion of uncured monomer into the regions where monomer had been depleted by ultraviolet radiation.

After the diffusion step a wavefront lensometer was used to measure the resulting OPD pattern in each optical element. The peak-to-valleys of the OPD patterns for the optical elements were found to be 8.189 microns, 7.823 microns, and 7.725 microns with (3,−3) Zernike coefficients of 1.853 microns, 1.755 microns, and 1.719 microns respectively. The optical elements were taken out of the oven at 105 C and placed in a hot box set at 85 C. A Dymax UV lamp with a square cross-section mixing rod was used to produce a uniform beam of ultraviolet radiation (Intensity≈30 mW/cm$^2$), and flood cure each optical element to lock in the OPD patterns. A wavefront lensometer was used to measure the OPD pattern of the lens after flood curing. The peak-to-valleys of the OPD patterns for the optical elements were found to be 7.974 microns, 7.856 microns, and 7.586 microns with (3,−3) Zernike coefficients of 1.837 microns, 1.750 microns, and 1.707 microns respectively.

The average change in peak-to-valley for the OPD patterns during flood cure was only −1.33% for the three optical elements. The average final peak-to-valley for the OPD patterns in the three optical elements was 7.805 microns. This is about 2.84 times greater than the maximum peak-to-valley of 2.75 microns achieved by the prior art method as determined in Example 4.

Example 6

Stability of Optical Elements During Accelerated Thermal Aging

Two of the optical elements of Example 5 were placed in an oven at 123 C for 85.5 hours to accelerate aging and simulate 10 years of thermal aging (assuming a doubling in aging rate for every 10 C increase in temperature) at near standard temperature (23 C).

Before the accelerated aging was performed, the peak-to-valleys of the OPD patterns in the optical elements were 7.974 microns and 7.856 microns. After the accelerated aging, a lensometer was used to measure the OPD patterns of the optical elements.

The peak-to-valleys of the OPD patterns were 7.838 microns, and 7.389 microns, respectively, corresponding to an average peak-to-valley change of only −3.8% during the accelerated aging.

Example 7

Instability of Prior Art Optical Elements During Accelerated Thermal Aging

Four plano power optical elements were prepared as described in Example 1. Each optical element was placed in a hot box with a lens holder at 85 C. The DLP system described in Example 2 was used to expose each optical element to an ultraviolet radiation pattern corresponding to the (3,−3) trefoil aberration.

A wavefront lensometer was used to measure the resulting OPD pattern in each optical element. Each optical element was exposed to the radiation pattern until an OPD of approximately 1.5 microns was achieved using prior art methodology.

The samples were then placed in an oven at 73 C to accelerate thermal aging. Before the thermal aging was started, the samples had OPD values of 1.37, 1.43, 1.40, and 1.44 microns for an average of 1.41 microns. The samples were pulled out of the oven at various times and remeasured. After 84 hours of aging at 73 C (16 weeks of simulated aging at near standard temperature using the assumption of doubling in aging rate for every 10 C increase in temperature above 23 C), the OPD values of the four prior art wavefront aberrators were 2.25, 2.18, 2.10, and 2.08 microns respectively for an average of 2.15 microns.

Figure 5:
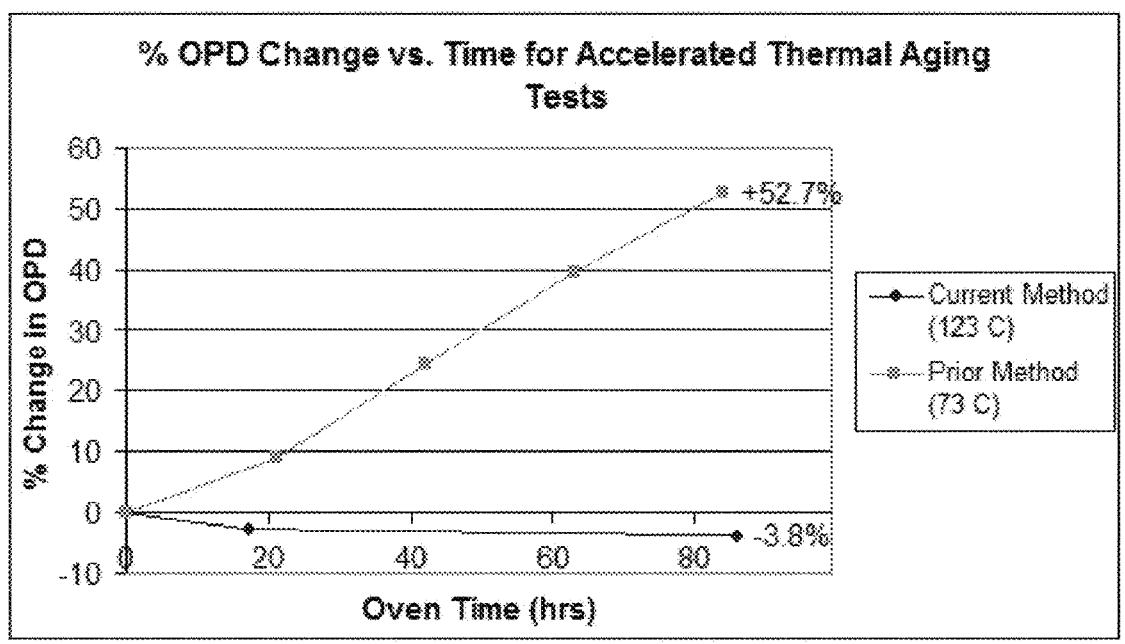
FIG. 5 shows percentage of OPD change vs time for accelerated thermal aging tests.

FIG. 5 shows the average percent change in OPD versus oven time for the two wavefront aberrators of the current invention described in Example 6 along with the four prior art wavefront aberrators of this Example. Clearly, the samples created using the method of the subject invention demonstrate much better thermal stability than the prior art samples even under far more severe accelerated aging conditions.

Example 8

Stability of Subject Invention During Hardcoating and AR

Four plano power optical elements were prepared as described in Example 1. Each optical element was placed in a hot box with a lens holder at 85 C. The DLP system of Example 2 was used to expose the formulation layer of each optical element to an ultraviolet radiation pattern corresponding to the aberrations of a model eye 150 seconds.

The optical elements were then put in an oven at 105 C for 4 hours to force diffusion of uncured monomer into the regions where monomer had been depleted by ultraviolet radiation induced curing. The optical elements were taken out of the oven at 105 C and placed in another hot box set at 85 C. A Dymax UV lamp with a square cross-section mixing rod was used to produce a uniform beam of ultraviolet radiation (Intensity≈30 mW/cm$^2$), and flood cure each optical element to lock in the OPD patterns. A wavefront lensometer was used to measure the OPD pattern of the optical elements after flood curing.

The peak-to-valleys of the OPD patterns were 2.591 microns, 2.351 microns, 2.272 microns, and 2.363 microns for an average of 2.39 microns. The optical elements were coated with a state-of-the-art hard-coat and UV-blocking primer. A wavefront lensometer was used to measure the OPD patterns of the optical elements after the hard-coating operation.

The peak-to-valleys of the OPD patterns were 2.498 microns, 2.204 microns, 2.137 microns, and 2.271 microns for an average of 2.28 microns. The average peak-to-valley of the OPD patterns had changed by only 4.9% during the hard-coating operation. The optical elements were then treated with a state-of-the-art AR coat. A wavefront lensometer was used to measure the OPD patterns of the optical elements after the AR coating operation.

The peak-to-valleys of the OPD patterns were 2.456 microns, 2.213 microns, 2.149 microns, and 2.264 microns for an average of 2.27 microns. The average peak-to-valley of the OPD patterns had changed by a total of only 5.2% during the hard-coating and AR coating operations.

Example 9

Instability of Prior Art During Hardcoating and AR

Three plano power optical elements were prepared as described in Example 1. The optical elements were placed in a hot box with a lens holder at 85 C. A Dymax UV lamp with a square cross-section mixing rod was used to produce a uniform beam of ultraviolet radiation (Intensity≈15 mW/cm$^2$). The central region of the sandwiched gels 230 in the optical elements 250 were exposed to ultraviolet radiation with a trefoil pattern re-imaged from the photomask (FIG. 6) for 5 minutes. A ZYGO interferometer was used to measure the OPD pattern created in the sandwiched gels. The peak-to-valleys for the OPD patterns were 1.33 microns, 1.39 microns, and 1.31 microns for an average of 1.34 microns. The optical elements were then treated with a state-of-the art AR coat. A ZYGO interferometer was used to measure the OPD pattern created in the sandwiched gel for the optical elements after they were AR coated.

The peak-to-valleys for the OPD patterns were 3.91 microns, 4.08 microns, and 3.70 microns for an average of 3.90 microns. The average peak-to-valley of the OPD patterns in the optical elements had increased by 190% during the AR coating operation.

In contrast the average OPD pattern seen in optical elements in Example 8 prior to accelerated aging changed by a total of only 5.2% during state-of-the-art hard-coating and AR-coating operations.

Example 10

Instability of Prior Art During Accelerated Weathering Tests

Four plano power optical elements were prepared as described in Example 1. Each optical element was placed in a hot box with a lens holder at 85 C. The DLP system described in Example 2 was used to expose each optical element to an ultraviolet radiation pattern corresponding to the (3,−3) trefoil aberration. A wavefront lensometer was used to measure the resulting OPD pattern in each optical element. Each optical element was exposed to the radiation pattern until an OPD of approximately 1.5 microns was achieved using prior art methodology.

The samples were then placed in a QUV chamber for 10 days to accelerate weathering and simulate two years of weathering. The samples demonstrated severe instability to accelerated weathering conditions as the percent OPD changes for different samples ranged from −55.3% to +59.6%. The data for the samples is summarized in Table 2.

TABLE 2

| | Accelerated Weathering | | |
|---|---|---|---|
| Sample# | Initial OPD (microns) | OPD after QUV (microns) | % Change OPD |
| 1 | 1.47 | 0.66 | −55.3 |
| 2 | 1.63 | 1.05 | −35.6 |
| 3 | 1.46 | 2.32 | 59.6 |
| 4 | 1.77 | 1.36 | −23.4 |

Example 11

Stability of the Subject Invention During Accelerated Weathering

Three plano power optical elements were prepared as described in Example 1. Each optical element was placed in a hot box with a lens holder at 85 C. The DLP system of Example 2 was used to expose the formulation layer of each wavefront aberrator to an ultraviolet radiation pattern corresponding to the aberrations of a model eye for 240 seconds.

The optical elements were then put in an oven at 105 C for 4 hours to force diffusion of uncured monomer into the regions where monomer had been depleted by ultraviolet radiation. The optical elements were taken out of the oven at 105 C and placed in another hot box set at 85 C.

A Dymax UV lamp with a square cross-section mixing rod was used to produce a uniform beam of ultraviolet radiation (Intensity≈30 mW/cm$^2$), and flood cure each optical element and lock in the OPD patterns. A wavefront lensometer was used to measure the OPD pattern of the optical elements after flood curing.

The peak-to-valleys of the OPD patterns were 3.747 microns, 3.545 microns, and 3.946 microns, for an average of 3.75 microns. The optical elements were then put in a QUV chamber for 10 days to accelerate weathering, and simulate 2 years of weathering. A wavefront lensometer was used to measure the OPD pattern of the optical elements after accelerated aging in the QUV chamber.

The peak-to-valleys of the OPD patterns were 3.853 microns, 3.745 microns, and 4.186 microns, for an average of 3.93 microns. The average peak-to-valley of the OPD patterns had changed by a total of only 4.9% during the accelerated aging in the QUV chamber.

Example 12

Instability of Prior Art During Flood Irradiation

A plano power optical element was prepared as described in Example 1. The optical element was placed in a hot box with a lens holder at 85 C. A Dymax UV lamp with a square cross-section mixing rod was used to produce a uniform beam of ultraviolet radiation (Intensity≈31 mW/cm$^2$) which illuminated a photomask containing a gray scale rendition of a trefoil pattern.

The central region of the sandwiched gel 230 in the optical element 250 was exposed to ultraviolet radiation with a trefoil pattern re-imaged from the photomask (FIG. 6) for 30 seconds. A wavefront lensometer was used to measure the OPD pattern created in the sandwiched gel. The peak-to-valley for the OPD pattern was 0.910 microns. A Dymax UV lamp with a square cross-section mixing rod was used to produce a uniform beam of ultraviolet radiation (Intensity≈30 mW/cm$^2$), and flood cure the optical element.

The peak-to-valley for the OPD pattern was 0.216 microns. The peak-to-valley of the OPD pattern in the optical element had decreased by 76.3% during flood curing. In contrast the peak-to-valley for the optical element of Example 2 where monomer was allowed to diffuse into regions where monomer was depleted by UV curing prior to flood curing decreased by an average of only 6.7% during flood curing.

Example 13

Temperature Dependence of Substrate Flexibility and the Effect on Diffusion Rate/OPD Change Six plano power optical elements were prepared as described in Example 1. The optical elements were placed in a hot box with a lens holder at 85 C. A Dymax UV lamp with a square cross-section mixing rod was used to produce a uniform beam of ultraviolet radiation (Intensity≈15 mW/cm$^2$) which illuminated a photomask containing a gray scale rendition of a trefoil pattern.

The central region of the sandwiched gels 230 in the optical elements 250 were exposed to ultraviolet radiation with a trefoil pattern re-imaged from the photomask (FIG. 6) for 5 minutes. A ZYGO interferometer was used to measure the OPD pattern created in the sandwiched gels.

The peak-to-valleys for the OPD patterns of the first set of three lenses were 1.34 microns, 1.39 microns, and 1.40 microns for an average of 1.38 microns. The peak-to-valleys for the second set of three lenses were 1.37 microns, 1.43 microns, and 1.40 microns for an average of 1.40 microns.

The three lenses of the first set were stored at room temperature (23 C) for 102 days, and were then remeasured using the ZYGO interferometer. The peak-to-valleys were 1.38 microns, 1.39 microns, and 1.40 microns for an average of 1.39 microns. Thus, the average peak-to-valley for the lenses stored at room temperature had only changed by about 1% over the course of 102 days.

The three lenses of the second set were stored at 73 C for 23 days, and were then remeasured using the ZYGO interferometer. The peak-to-valleys were 3.25 microns, 3.21 microns, and 3.06 microns for an average of 3.17 microns. Thus, the average peak-to-valley for the lenses stored at 73 C had increased by about 140% over the course of 23 days. Clearly, the Samsung EyeTech 1.6 lenses used as substrates were not flexible enough to allow for swelling of the sandwiched gel by diffusion of monomer at room temperature (23 C), but were flexible enough at 73 C.

Example 14

Visual Example of OPD Growth During Diffusion

Figure 7A:
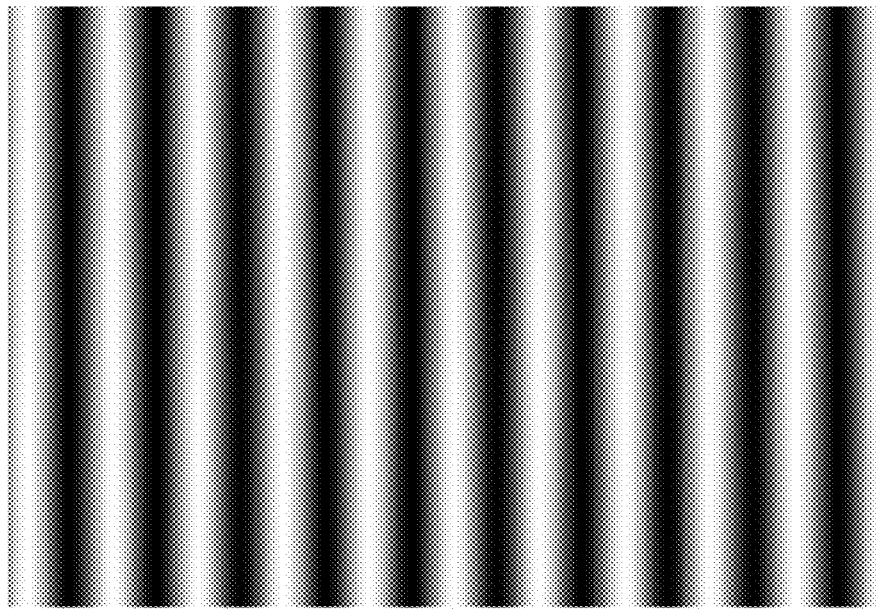
FIG. 7a-7f illustrates the OPD growth during the diffusion process as well as the ultraviolet pattern used to irradiate the lens.
Figure 7B:
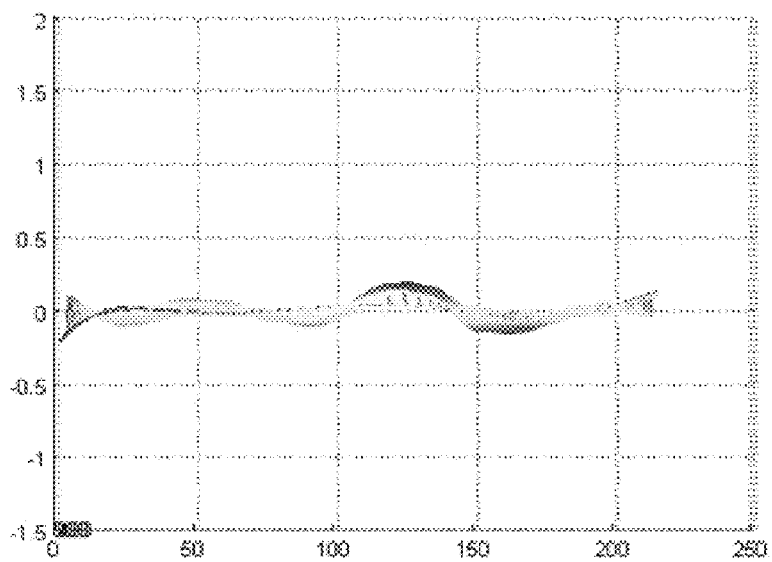
Figure 7C:
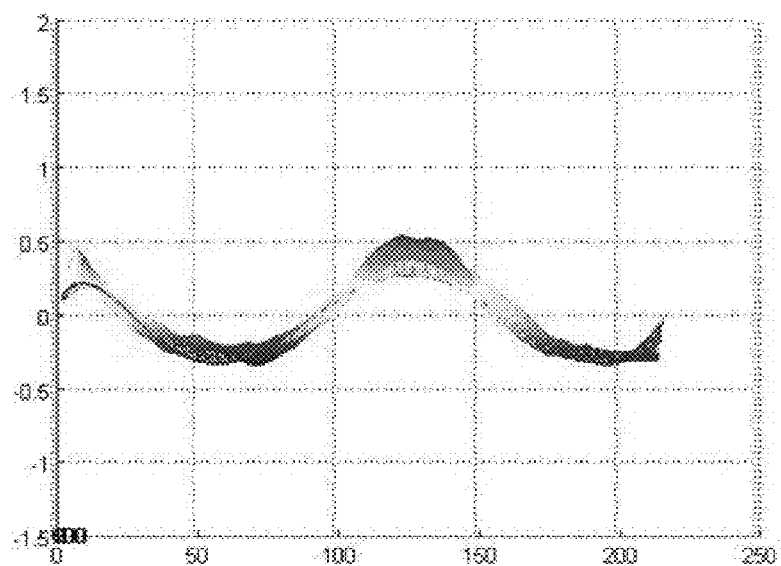
Figure 7D:
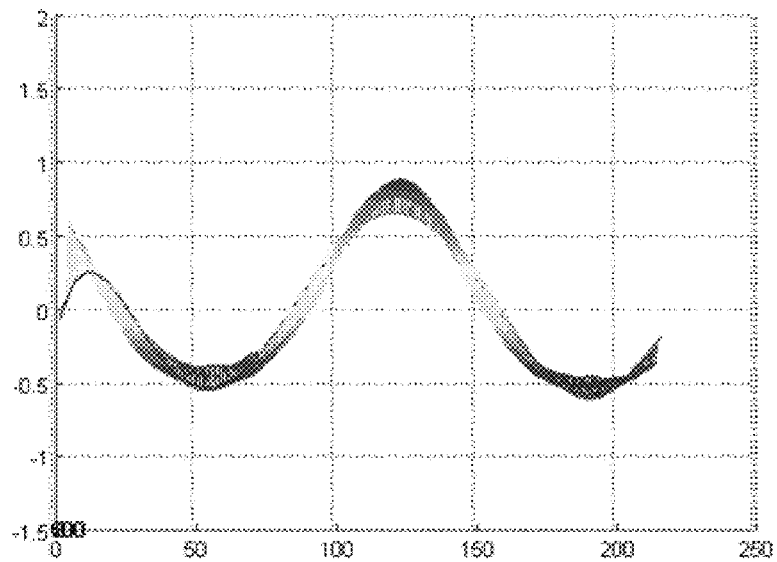
Figure 7E:
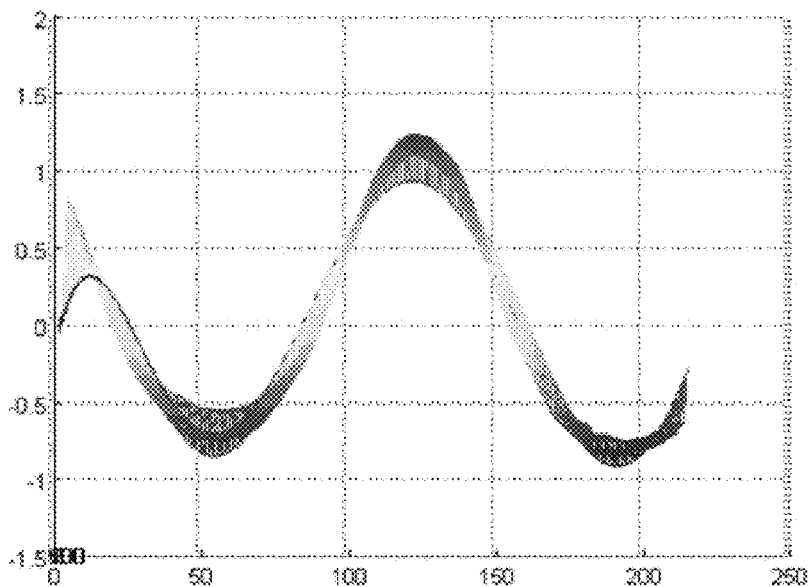
Figure 7F:
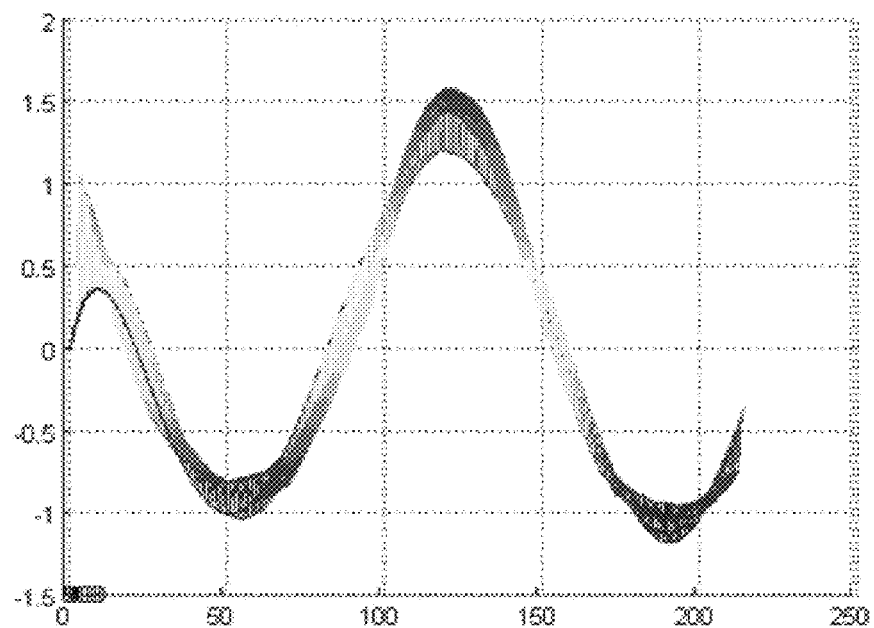

A plano power optical element was prepared as described in Example 1. The optical element was placed in a hot box with a lens holder at 85 C. The DLP setup of Example 2 was used to expose the formulation layer of the optical element to a sinusoidal (periodicity=6 mm) ultraviolet radiation pattern (FIG. 7A) re-imaged from the micro-mirror array for 140 seconds.

Measurements of the OPD pattern at various times during the radiation time were taken using a wavefront lensometer. After the radiation was complete, the temperature of the lens hot box was turned up to 105 C, and the lens was kept inside for 8 hours to force diffusion of uncured monomer into the regions where monomer had been depleted by ultraviolet radiation.

Measurements of the OPD pattern at various times during the diffusion process were taken using a wavefront lensometer. Illustrations of the OPD growth during the diffusion progression as well as the ultraviolet pattern used to irradiate the lens are shown in FIGS. 7B-7F.

Example 15

Figure 6:
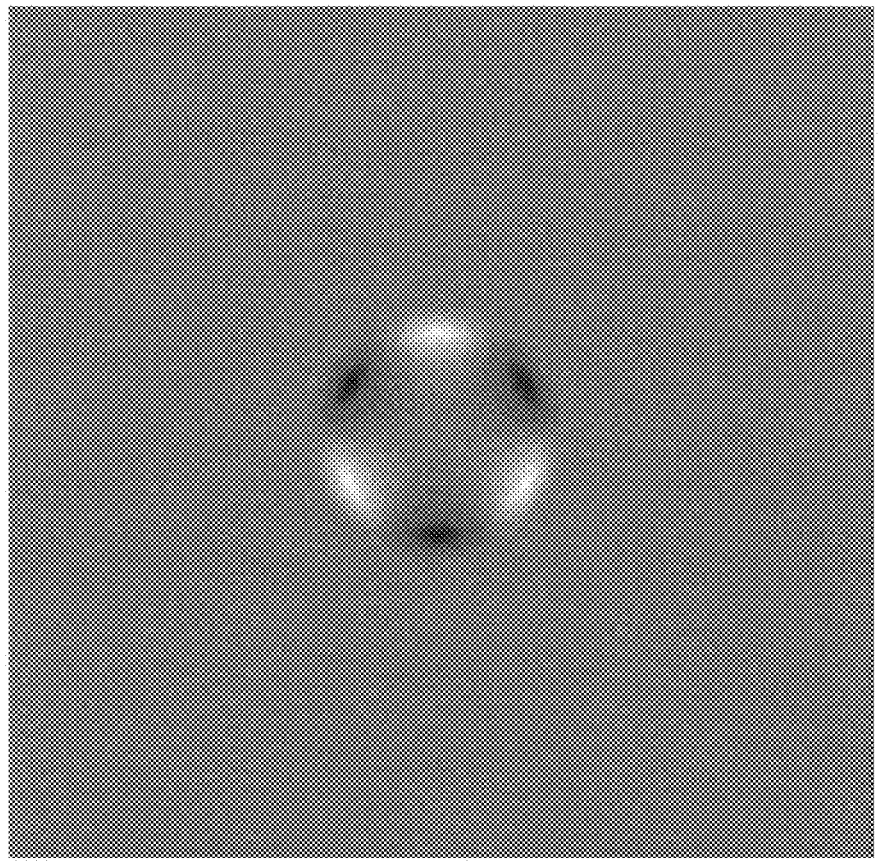
FIG. 6 is a reproduction of a photograph of a photomask suitable for writing a trefoil pattern in an optical element.

Demonstration of Formulation Layer Swelling and Changes in Substrate Topography During Diffusion A plano power optical element was prepared as described in Example 1. The optical element was placed in a hot box with a lens holder at 85 C. A Dymax UV lamp with a square cross-section mixing rod was used to produce a uniform beam of ultraviolet radiation (Intensity≈31 mW/cm$^2$), which illuminated a photomask containing a trefoil pattern (FIG. 6).

Figure 8:
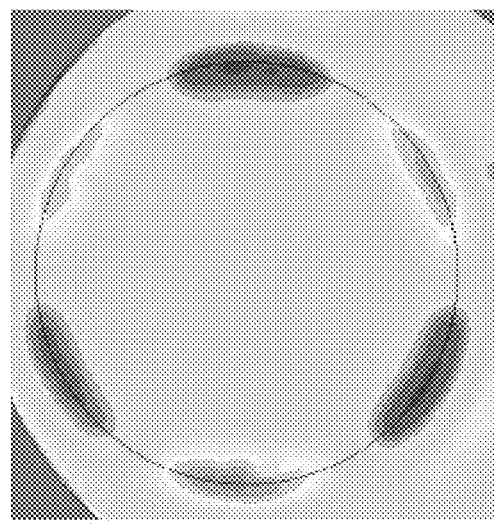
FIG. 8 illustrates the OPD pattern measured by the lensometer with the blue regions corresponding to low OPD (valleys) and the red regions corresponding to high OPD (peaks).

The central region of the sandwiched gel 230 in the optical element 250 was exposed to ultraviolet radiation re-imaged from the photomask for 20 seconds. A wavefront lensometer was used to measure the OPD pattern created in the sandwiched gel. The peak-to-valley for the OPD pattern was 1.30 microns. The OPD pattern measured by the lensometer is shown in FIG. 8 with the blue regions corresponding to low OPD (valleys) and the red regions corresponding to high OPD (peaks).

Figure 9:
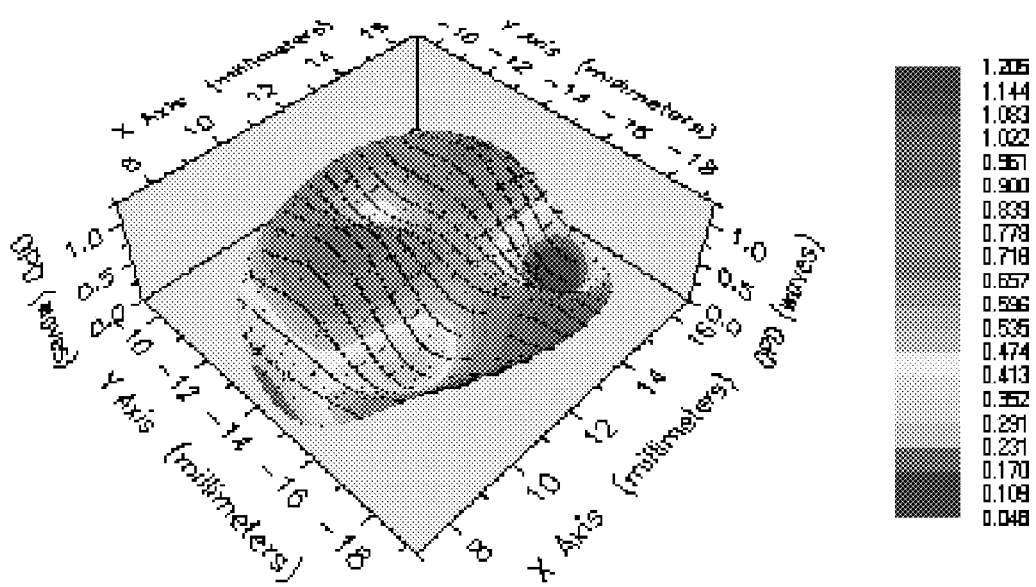
FIG. 9 illustrates the surface profile of a lens measured by an interferometer.

The front surface of the lens was then measured on a ZYGO interferometer using a reference transmission sphere. Fringes from only the front surface of the lens were used as fringes that would have been contributed by the back surface were eliminated by applying ultra-flat black paint to that surface. The surface profile of the lens measured by the ZYGO is shown in FIG. 9. The peak-to-valley of the front surface profile was determined to be 0.73 microns.

The peaks of the surface topology are represented by blue areas (low OPD) and the valleys are represented by the red areas (high OPD). The peaks of the surface topology actually have a lower OPD (as seen by the ZYGO when using the transmission sphere to measure only the surface) because the surface protrudes towards the ZYGO at the peaks, and there is a shorter distance between the ZYGO and the surface of the lens. Conversely, the valleys of the surface topology will be further from the ZYGO, causing a higher OPD to be measured in those regions. The picture of the surface topology shows there is a valley at the top in the ZYGO surface data, meaning that the surface is raised there, producing a shorter optical path and lower OPD to the interferometer. At the bottom of the surface there is a peak in the ZYGO surface data, meaning the surface is depressed there, giving a larger optical path length. Comparing the surface OPD map from the ZYGO to the lensometer OPD map (corresponding to the overall OPD through the entire optical element), the surface OPD counteracts the overall OPD.

As mentioned previously, in regions where the sandwiched gel increases in refractive index by curing, there is a decrease in thickness as the gel shrinks and pulls the substrates closer to each other. However, the OPD increase caused by refractive index increase is greater than the OPD loss caused by the decrease in thickness.

Figure 10:
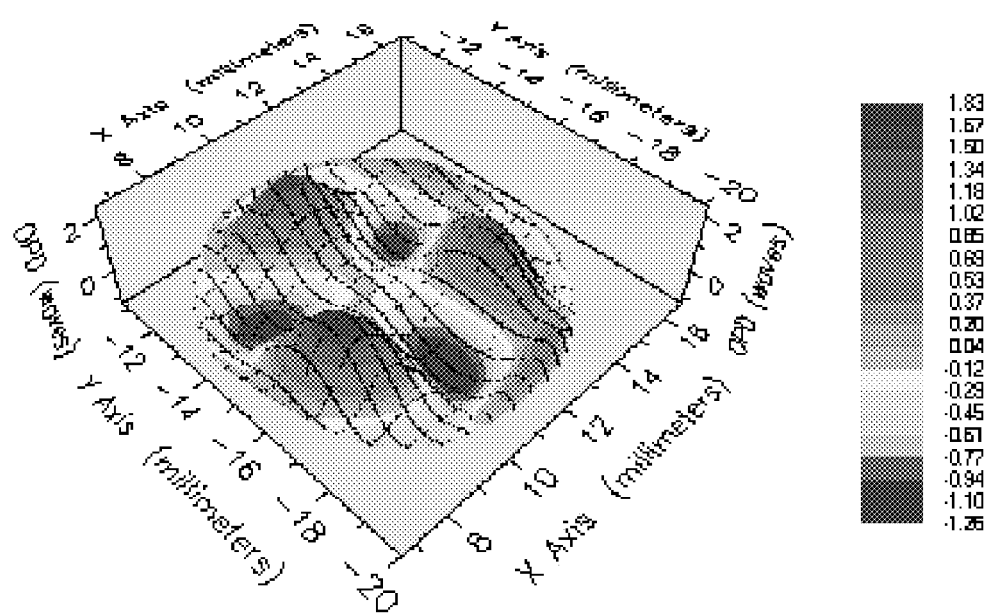
FIG. 10 shows the surface topography of a lens.
Figure 11:
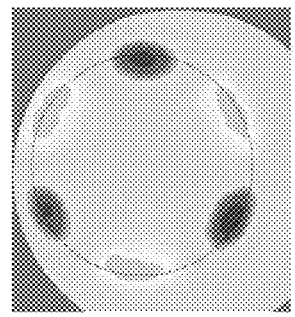
FIG. 11 shows a lensometer OPD map.
Figure 12A:
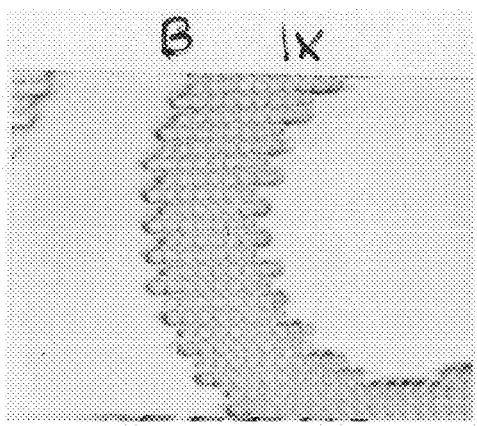
FIG. 12 shows the appearance of the logos under a DIC microscope.
Figure 12B:
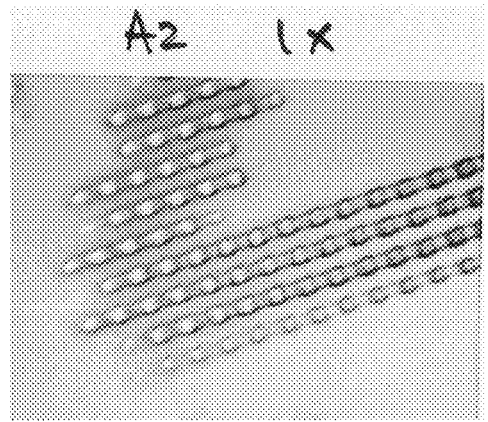
Figure 12C:
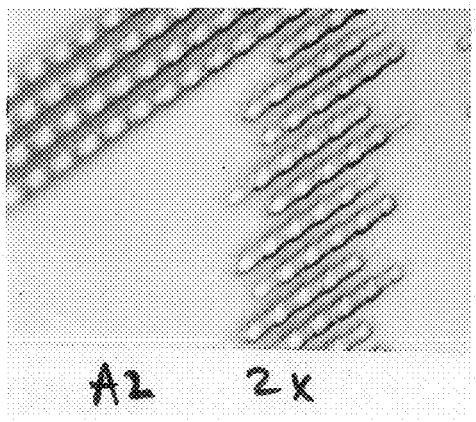
Figure 12D:
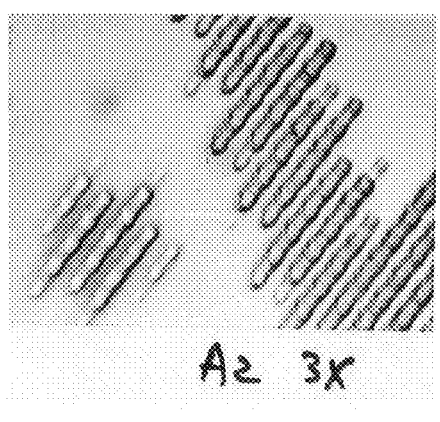

After the surface measurement was conducted using the ZYGO interferometer, the lens was placed in an oven at 105 C for 7.5 hours to allow diffusion of monomer from uncured regions of high monomer concentration to cured regions where monomer concentration had been depleted by UV radiation. This diffusion occurs due to Fick's Law. The lens was returned to room temperature, and its front surface topology (shown in FIG. 10) was again measured on the ZYGO interferometer using the reference transmission sphere. The polarity of the front surface topology had inverted, and the surface peak-to-valley was 1.95 microns. There was now a peak at the top, and a valley at the bottom in the ZYGO image, meaning a valley (or depression) at the top and a peak (a raise) at the bottom on the actual surface. The black paint on the back surface was removed with acetone, and the OPD pattern through the entire optical element was measured on the lensometer. The transmission peak-to-valley was 7.5 microns. Comparing the surface OPD map from the ZYGO (FIG. 10) to the lensometer OPD map (FIG. 11), the peaks of the surface and the overall OPD map were now aligned. The OPD due to the surface now reinforces the OPD measured by transmission. This verified that the diffusion of monomer from uncured regions to cured regions had caused swelling of the gel in those regions, causing the substrates to bulge outward and increase the thickness of the optical element in those regions. Those skilled in the art will understand that the back surface topology probably behaved very similarly to the front surface topology throughout the experiment, but this was not monitored.

Example 16

Use of Current Invention to Write a Permanent Trademark into Optical Elements

A plano power optical element was prepared as described in Example 1. An ultraviolet laser was used to radiate the sandwiched gel layer with a pattern corresponding to the trademark "iZon" logo. The laser was a Spectra Physics J20E-BL8-355Q, Q-Switched Nd:YVO$_4$, (Neodymium doped Yttrium Vanadium Oxide) laser. The laser is all solid state and is diode pumped. The output wavelength is 355 nm. The output is nominally a 25 kHz train of 8 nanosecond pulses. Typical average output power is about 500 mW, although only 23 mW was used in the following examples. The output beam is vertically polarized, 1 mm+−10% in diameter, with less than 0.7 mrad divergence before focusing. The high resolution of the laser writer allows one to write the logo as a series of evenly spaced 40-micron wide lines.

The trademark "iZon" logo was written using two different processes. These will be called processes A and B. Both process A and process B were written in a single lens blank, each in three different places for a total of 6 logos. In one position, the laser radiation pattern was done once. In a second position the laser radiation pattern was done twice, so as to give a larger dose of ultraviolet. In a third position the laser radiation pattern was repeated three times to give the maximum UV dose for this test. The laser power was 23 mW. Subsequently the lens blank was held at 85 C for 30 minutes to force diffusion of uncured monomer to more highly cured regions where monomer was depleted by UV curing. A Dymax UV lamp with a square cross-section mixing rod was used to produce a uniform beam of ultraviolet radiation (Intensity≈30 mW/cm$^2$), and flood cure the optical element. If the diffusion step is eliminated, the logo is erased by the flood cure step.

The appearance of the logos under a DIC microscope is shown in FIG. 12. Process A writes 40-micron wide lines with spaces between the lines roughly 40-microns wide. Process B writes lines with no spaces. The pulsed nature of the laser beam is evident especially for the 1× writings, and multiple writings tend to make the lines look more continuous. A larger UV dose tends to make the logo letters have higher contrast, so further curing is occurring with further passes.

Figure 13:
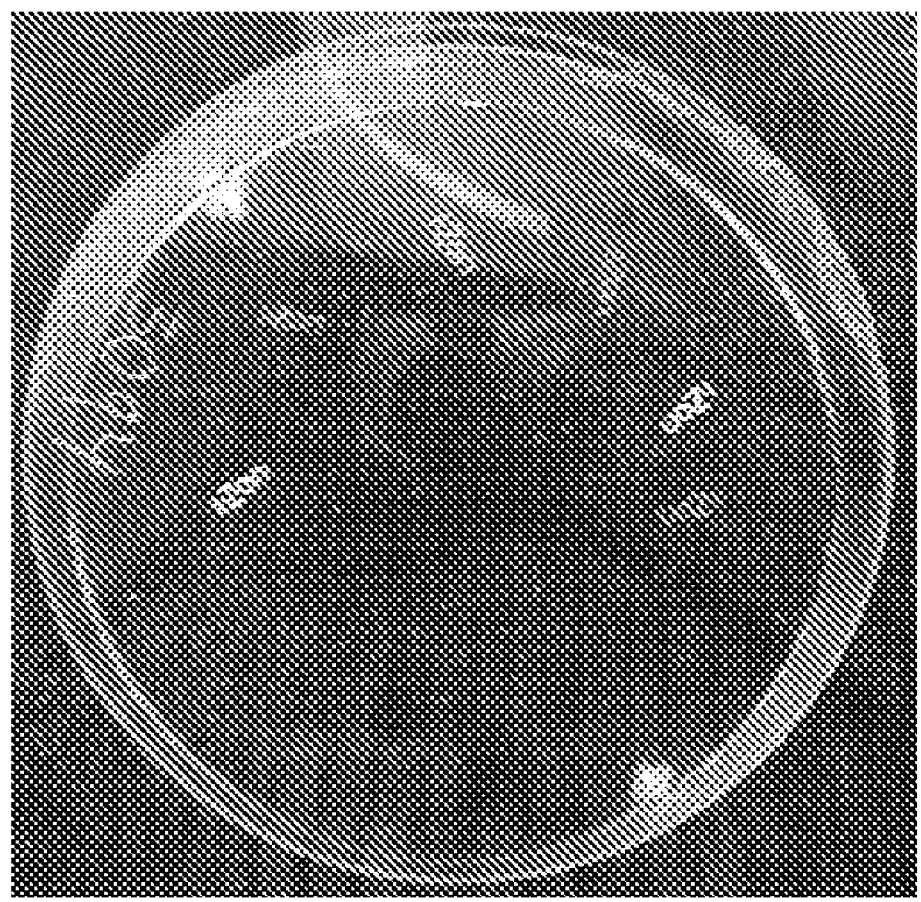
FIG. 13 shows a lens containing six "iZon" logos each made with a slightly different process.

After the diffusion and flood cure steps, all of the logos appeared weaker under the DIC microscope. However, they were still visible to the naked eye. Due to diffraction effects from the parallel lines from which the letters were written, the logos are particularly visible when held up to a light at certain angles. FIG. 13 shows the lens containing the six "iZon" logos each made with a slightly different process.

All patents, patent applications, provisional applications, and publications referred to or cited herein are incorporated by reference in their entirety, including all figures and tables, to the extent they are not inconsistent with the explicit teachings of this specification.

It should be understood that the Examples and embodiments described herein are for illustrative purposes only and that various modifications or changes in light thereof will be suggested to persons skilled in the art and are to be included within the spirit and purview of this application.

What is claimed is:

1. A wavefront aberrator that has a stable variable refractive index profile and a stable optical path difference (OPD), wherein the wavefront aberrator comprises:
    a first transparent plate;
    a second transparent plate; and
    a layer of polymerizable material comprising one or more monomers, wherein the layer of polymerizable material is positioned between the first transparent plate and the second transparent plate and wherein the polymerizable material has a stable final variable refractive index profile and a stable final OPD created by a method comprising:
        a. providing a variable photo-stimulus to the polymerizable material having an initial refractive index to cause the polymerizable material to (i) undergo a variable pattern of polymerization without completely depleting the one or more monomers and (ii) attain a first intermediate variable refractive index profile and an OPD that provides Zernike polynomial terms harmonic to the Zernike polynomial terms provided by the stable variable refractive index profile of the wavefront aberrator;
        b. promoting a diffusion process within the polymerizable material provided in step (a) to cause diffusion of uncured monomer from lesser cured regions to higher cured regions to attain a second intermediate variable refractive index profile; and
        c. simultaneously providing a thermal stimulus and a uniform photo-stimulus to the polymerizable material provided in step (b) to cure one or more remaining one or more uncured regions of the polymerizable material to attain the stable final variable refractive index profile and the stable final OPD.

2. The wavefront aberrator of claim 1, wherein step (a) further comprises simultaneously providing a thermal stimulus to the polymerizable material.

3. The wavefront aberrator of claim 1, wherein the stable final OPD is more than 0.01 microns.

4. The wavefront aberrator of claim 1, wherein the stable final OPD is more than 3 microns.

5. The wavefront aberrator of claim 1, wherein the stable final OPD is more than 10 microns.

6. The wavefront aberrator of claim 1, wherein the stable final OPD is more than 50 microns.

7. The wavefront aberrator of claim 1, wherein the stable final OPD is more than 100 microns.

8. The wavefront aberrator of claim 1, wherein the wavefront aberrator is a lens for eyeglasses or contact lens.

9. The wavefront aberrator of claim 1, wherein the polymerizable material comprises a thiol-cured epoxy.

10. The wavefront aberrator of claim 1, wherein the diffusion process is promoted by heating the polymerizable material to at least 85° C.

11. The wavefront aberrator of claim 1, wherein the OPD after the diffusion process is at least twice the OPD before the diffusion process.

12. The wavefront aberrator of claim 2, wherein the stable final OPD is more than 0.01 microns.

13. The wavefront aberrator of claim 2, wherein the stable final OPD is more than 3 microns.

14. The wavefront aberrator of claim 2, wherein the stable final OPD is more than 10 microns.

15. The wavefront aberrator of claim 2, wherein the stable final OPD is more than 50 microns.

16. The wavefront aberrator of claim 2, wherein the stable final OPD is more than 100 microns.

17. The wavefront aberrator of claim 2, wherein the wavefront aberrator is a lens for eyeglasses or contact lens.

18. The wavefront aberrator of claim 2, wherein the polymerizable material comprises a thiol-cured epoxy.

19. The wavefront aberrator of claim 2, wherein the diffusion process is promoted by heating the polymerizable material to at least 85° C.

20. The wavefront aberrator of claim 2, wherein the OPD after the diffusion process is at least twice the OPD before the diffusion process.

* * * * *